(12) United States Patent
Aissi et al.

(10) Patent No.: US 8,298,295 B2
(45) Date of Patent: Oct. 30, 2012

(54) THEFT-DETERRENCE METHOD AND APPARATUS FOR PROCESSOR BASED DEVICES

(75) Inventors: Selim Aissi, Beaverton, OR (US); Jasmeet Chhabra, Hillsboro, OR (US); Gyan Prakash, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 919 days.

(21) Appl. No.: 11/904,793

(22) Filed: Sep. 28, 2007

(65) Prior Publication Data
US 2009/0089887 A1    Apr. 2, 2009

(51) Int. Cl.
*G06F 21/00* (2006.01)
(52) U.S. Cl. .......................................... 726/35; 726/34
(58) Field of Classification Search ............... 726/35–36
See application file for complete search history.

(56) References Cited

U.S. PATENT DOCUMENTS

| | | | | |
|---|---|---|---|---|
| 5,748,084 A * | 5/1998 | Isikoff | | 340/568.1 |
| 6,052,782 A * | 4/2000 | Fleming, III | | 726/35 |
| 6,125,457 A * | 9/2000 | Crisan et al. | | 714/36 |
| 6,362,736 B1 * | 3/2002 | Gehlot | | 340/568.1 |
| 6,484,262 B1 * | 11/2002 | Herzi | | 726/34 |
| 6,725,379 B1 * | 4/2004 | Dailey | | 726/35 |
| 7,024,698 B2 * | 4/2006 | Tanaka et al. | | 726/26 |
| 7,058,709 B2 * | 6/2006 | Lamberton et al. | | 709/224 |
| 7,068,168 B2 * | 6/2006 | Girshovich et al. | | 340/568.3 |
| 7,546,639 B2 * | 6/2009 | Bantz et al. | | 726/27 |
| 7,818,803 B2 * | 10/2010 | Gordon | | 726/22 |
| 2002/0108058 A1* | 8/2002 | Iwamura | | 713/201 |
| 2002/0188866 A1* | 12/2002 | Ca et al. | | 713/201 |
| 2003/0126462 A1* | 7/2003 | Howard et al. | | 713/200 |
| 2005/0251868 A1* | 11/2005 | James | | 726/35 |
| 2006/0143717 A1* | 6/2006 | Ransome et al. | | 726/35 |
| 2006/0272034 A1* | 11/2006 | Bhansali et al. | | 726/34 |

* cited by examiner

*Primary Examiner* — Edan Orgad
*Assistant Examiner* — James Turchen
(74) *Attorney, Agent, or Firm* — Schwabe, Williamson & Wyatt, P.C.

(57) ABSTRACT

A manageability engine of a processor based device and a host theft-deterrence agent of the processor based device, jointly implement a theft-deterrence protocol with a theft-deterrence service, remotely disposed from the processor based device, to deter theft of the processor based device. The host theft-deterrence agent is configured to operate in a processor operated application execution environment of the processor based device, and the manageability engine is configured to operate outside the application execution environment.

15 Claims, 5 Drawing Sheets

THEFT-DETERRENCE METHOD AND APPARATUS FOR PROCESSOR BASED DEVICES

TECHNICAL FIELD

Embodiments of the present invention relate to the field of data processing, in particular, to methods and apparatuses for deterring theft of processor based devices.

BACKGROUND

With the advance of personal computing, making available computing power that was once reserved for main frame computing to ever increasing number of computing users, unfortunately, the theft of processor based devices, from desktops to mobile devices, has also increased. Prior art methods to deter or prevent theft have included physically securing the processor based devices to larger stationery objects to prevent the processor based devices from being stolen. For recovery, prior art also included services for recovering stolen devices via law enforcement agencies.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, methods and apparatuses for deterring theft of processor based devices.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
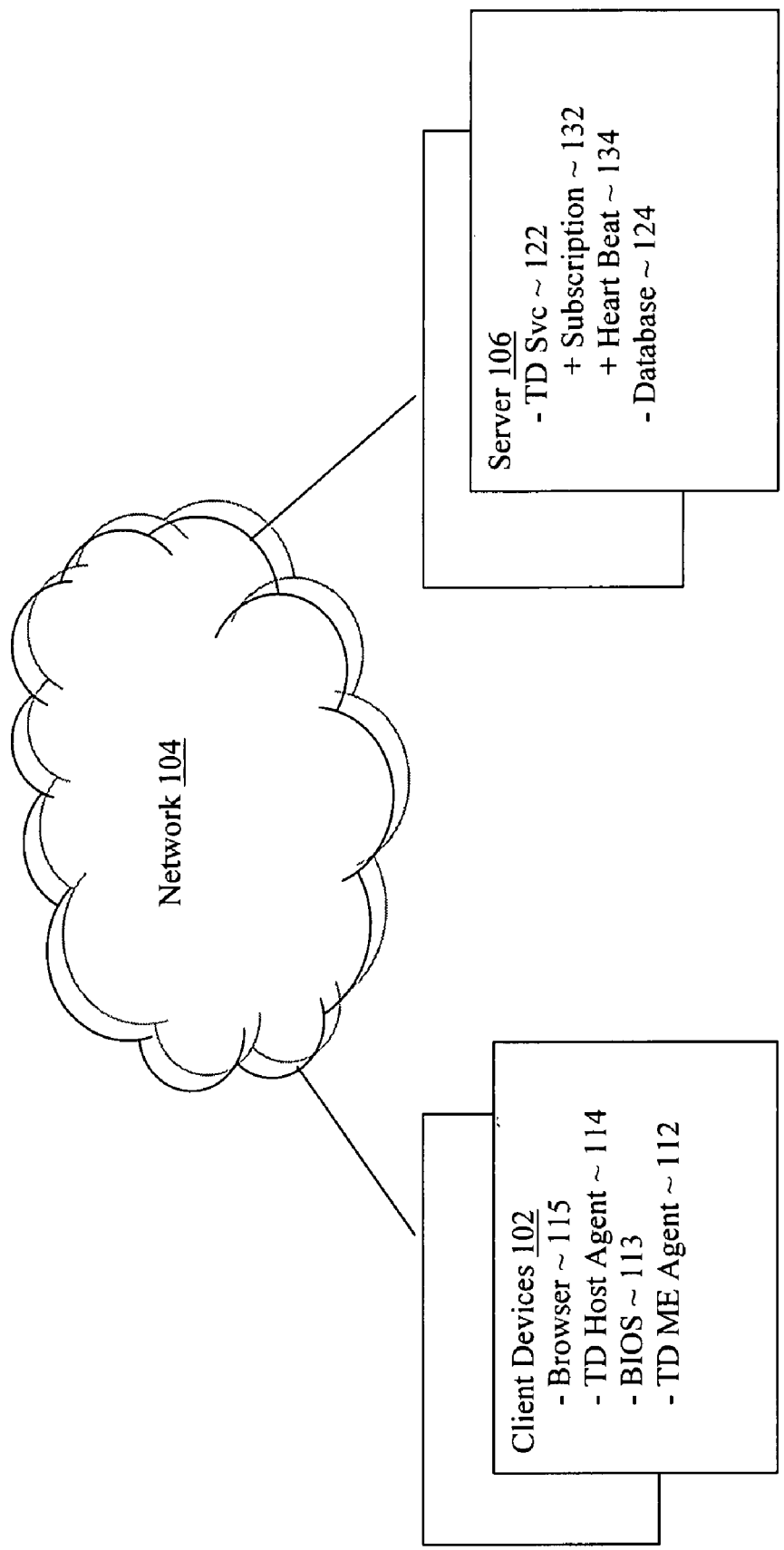
FIG. 1 illustrates an overview of various embodiments of the present invention.

FIG. 1 illustrates an overview of various embodiments of the present invention. As illustrated, each processor based device 102 (also referred interchangeably as client device) is provided with a theft-deterrence enabled manageability engine 112 and host theft-deterrence agent 114. In particular, manageability engine 112 and host theft-deterrence agent 114 are configured to jointly implement a theft-deterrence protocol with a theft-deterrence service 122, remotely disposed from client device 102, to deter theft of the client device 102. Theft-deterrence service 122 may be implemented on one or more remotely disposed servers 106. Client devices 102 may be coupled to server(s) 106 via one or more networks 104.

As will be described in more detail below, the theft-deterrence protocol includes manageability engine 112 periodically requesting a heartbeat message 134, including the current theft status of the client device 102, from the theft-deterrence service 122. And manageability engine 112 enforces one or more theft-deterrence policies on the client device 102, based at least in part on the theft status obtained from theft-deterrence service 122. Host theft-deterrence agent 114 is configured to assist manageability engine 112, including e.g. determining whether network 104 is accessible and/or obtaining from a user a secret to unlock client device 102, in the event client device 102 is locked down.

In various embodiments, the theft-deterrence policy may comprise locking a client device (102). In other embodiments, the theft-deterrence policy may alternatively or additionally comprise partially disabling the client device (102), shredding or deleting data from the client device (102), notify an owner of the client device (102), and/or notify a technical support group supporting the client device (102)

For the illustrated embodiments, host theft-deterrence agent 114 is configured to operate in a processor operated application execution environment of the client device 102, whereas manageability engine 112 is configured to operate outside the application execution environment. Client device 102 may have one or more processor operated application execution environments, virtual or otherwise.

Further, client device 102 may be any one of a number of processor based devices, including but are not limited to desktop computing devices, portable computing devices (laptops as well as handhelds), set-top boxes, and game consoles. Handhelds may include, but are not limited to, personal digital assistants, digital cameras, media players, and mobile phones. Server 106 may be any number of servers, including but are not limited to blade servers. Networks 104 may include one or more private and/or public, wire line based and/or wireless, local and/or wide area networks.

Additionally, for the illustrated embodiments, each client device 102 may include a basic input/output system (BIOS) 103 configured to cooperate with manageability engine 112 in implementing the theft-deterrence policies on client device 102, including but not limited to locking down the client device 102 or recovering the unlocking key from the device 102, when the theft status of the client device 102 is stolen.

In various embodiments, each client device 102 may further include a browser 104, whereas theft-deterrence service 122 may further include a subscription function 132 to facilitate the client devices 102 in subscribing with theft-deterrence service 122 or canceling that service. Theft-deterrence service 122 may be a pay or a free service, or combination thereof. For the embodiments, server(s) 106 hosting the theft-deterrence service 122 may include one or more databases 124 to store the subscribers and/or subscription related information. The databases 124 may be stored in one or more persistent storage, such as disk storage.

These and other aspects of the various embodiments, including the various elements and the manner the elements cooperate with each other to deter theft of the client devices 102, will be described in further details in turn below.

Figure 2:
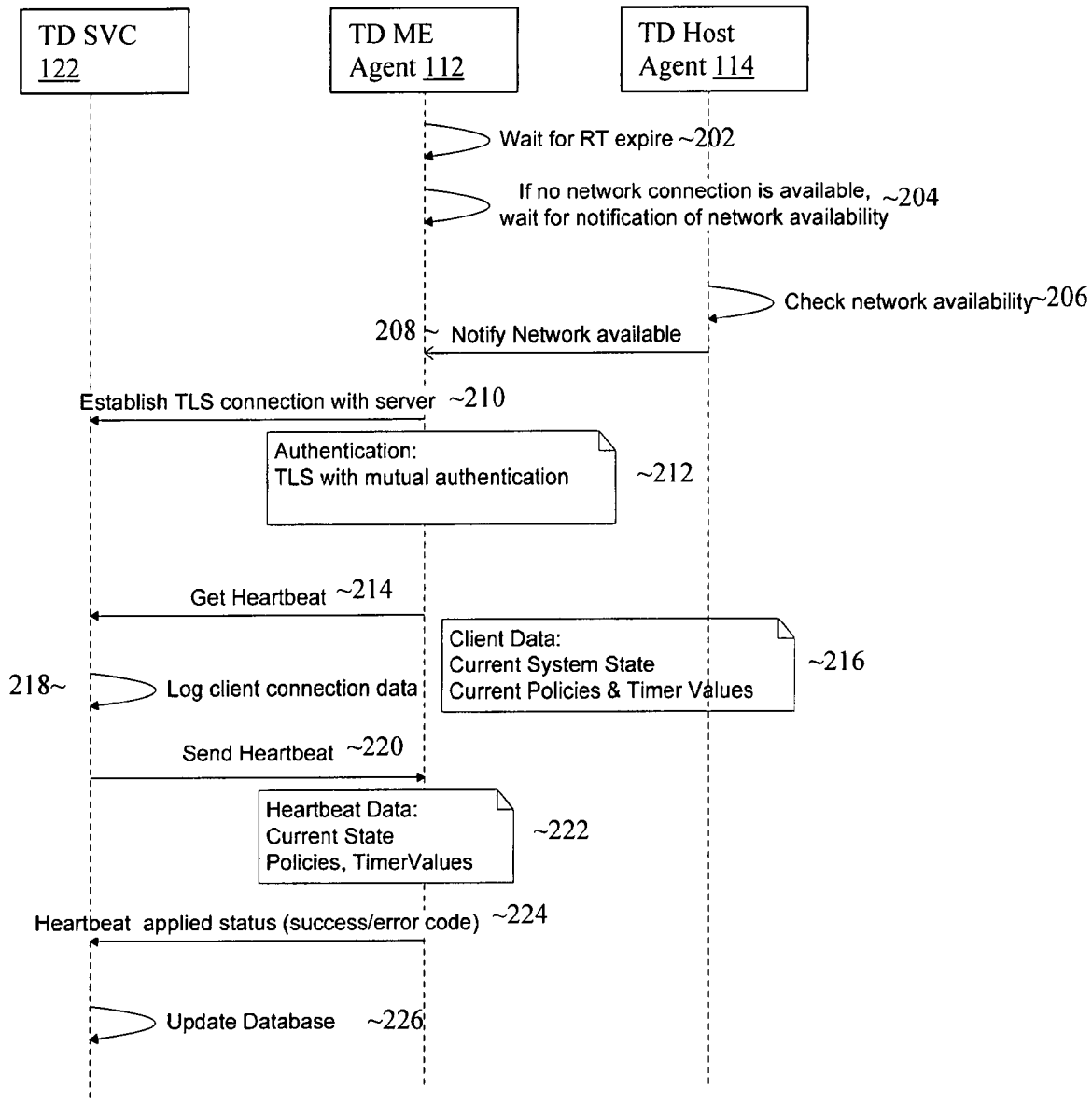
FIG. 2 illustrates selected operations of selected components to provide a processor based device with a theft status of the processor based device, in accordance with various embodiments of the present invention.

Referring now to FIG. 2, wherein selected operations of selected components for obtaining/providing the theft status of a client device are illustrated. As shown, during operation, for the embodiments, manageability engine 112 awaits for the expiration of a request timer (RT) value, 202. On expiration of the RT value, manageability engine 112 determines whether client device 102 has access to the network, 204. For the embodiments, manageability engine 112 makes the network availability determination by checking with host theft-deterrence agent 114, which performs the actual availability checking, 206, and reports back to manageability engine 112, 208.

If access to network 104 is determined to be available, manageability engine 112 establishes a network connection to theft-deterrence service 122, 210. The network connection may be a secure (TLS) connection. Therefore, manageability engine 112 and theft-deterrence service 122 may mutually authenticate each other, 212.

Upon authentication, manageability engine 112 may request for a heartbeat message from theft-deterrence service 122, 214. In various embodiments, each heartbeat request message 216 may include:
- identification of the client device
- the theft status currently held by manageability engine 112,
- a current RT timer value (at expiration of which, manageability engine 112 is to send the heart beat request message),
- a current enforcement timer (DT) value (at expiration of which, manageability engine 112 is to enforce a theft-deterrence policy on client device 102),
- a current platform disable priority value,
- a current encrypted data disable priority value, or
- a current theft-deterrence server rendezvous priority value.

In alternate embodiment, each heartbeat request message may include more or less data.

Continue to refer to FIG. 2, on receipt of the heartbeat request message, theft-deterrence service 122 logs the connection and request data, 218. In response, theft-deterrence service 122 sends the requested heartbeat message to manageability engine 112, 220. In various embodiments, each heartbeat message 222 may include:
- identification of the client device
- the theft status of the client device,
- an update to the RT value,
- an update to the DT value,
- an update to the platform disable priority value,
- an update to the encrypted data disable priority value,
- an update to a theft-deterrence server rendezvous priority value.

Similarly, in alternate embodiment, each heartbeat message may include more or less data, consistent with the heartbeat request message. The message may be transmitted between manageability engine 112 and theft-deterrence service 122 in any one of a number of formats, in accordance with any one of a number of messaging protocols.

Thereafter, manageability engine 112 may apply the data contained in the heartbeat message, and may report the success or failure in applying the data, 224. Theft-deterrence service 122 may log the report in its database, 226.

Figure 3:
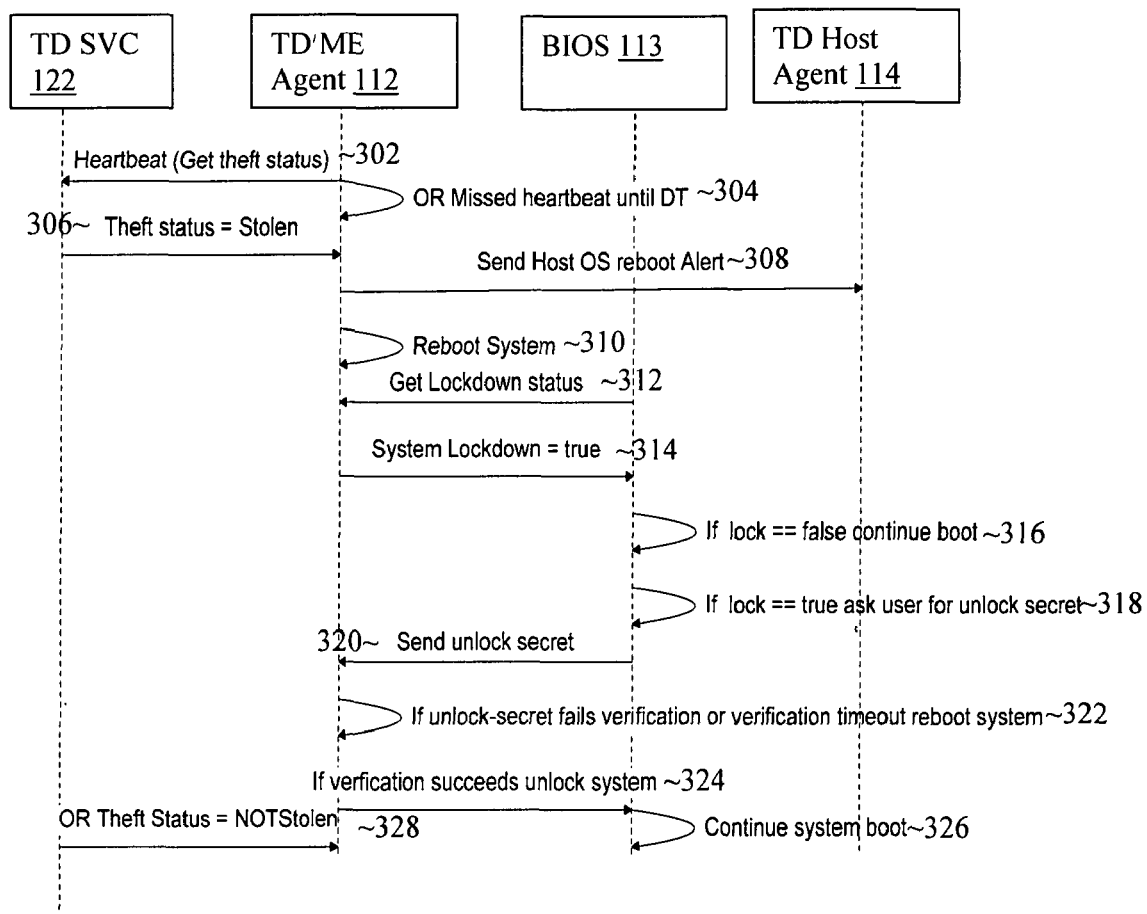
FIG. 3 illustrates selected operations of selected components to lock down or unlock a processor based device with a stolen theft status, in accordance with various embodiments of the present invention.

Referring now to FIG. 3, wherein selected operations of selected components for enforcing theft-deterrence policy or policies on a client device are illustrated. As shown, during operation, either on obtaining a stolen theft status from theft-deterrence service 122, 302 and 306, or on expiration of the DT value, 304, manageability engine 112 alerts host theft-deterrence agent 114, 308. Thereafter, manageability engine 112 causes the client device to reboot, 310.

For the embodiments, BIOS 113 is responsible for rebooting client device 102. Further, BIOS 113 is configured to obtain a system lock down status from manageability engine 112, 312. If the theft status is stolen, manageability engine 112 returns system lock down equals True to BIOS 113, 314. If the theft status is not stolen, manageability engine 112 returns system lock down equals False to BIOS 113.

On receipt of system lock down equals False, BIOS 113 would continue to complete the boot process, 316. However, on receipt of system lock down equals True, BIOS 113 would request a user of client device 102 to provide an unlock secret, 318. On receipt, BIOS 113 provides the inputted unlock secret to manageability engine 112, 320.

If the provided unlock secret is incorrect or the time allowed for its provision has expired, the client device 102 would remain locked (unable to boot). However, if the provided unlock secret is correct, manageability engine 112 notifies BIOS 113, 324. On receipt of the notification, BIOS 113 continues with the boot process, 326.

The unlock secret may be provisioned to manageability engine 112 in any one of a number of manners, including but not limited having the user provide to manageability engine 112 directly, or indirectly via theft-deterrence service 122 (with the user or an administrator (on behalf of the user) providing the info to theft-deterrence service 122 during initial service set up).

In various embodiments, a locked client device 102 may also become unlock through the receipt of an updated not stolen theft status from theft-deterrence service 122, 328.

Figure 4:
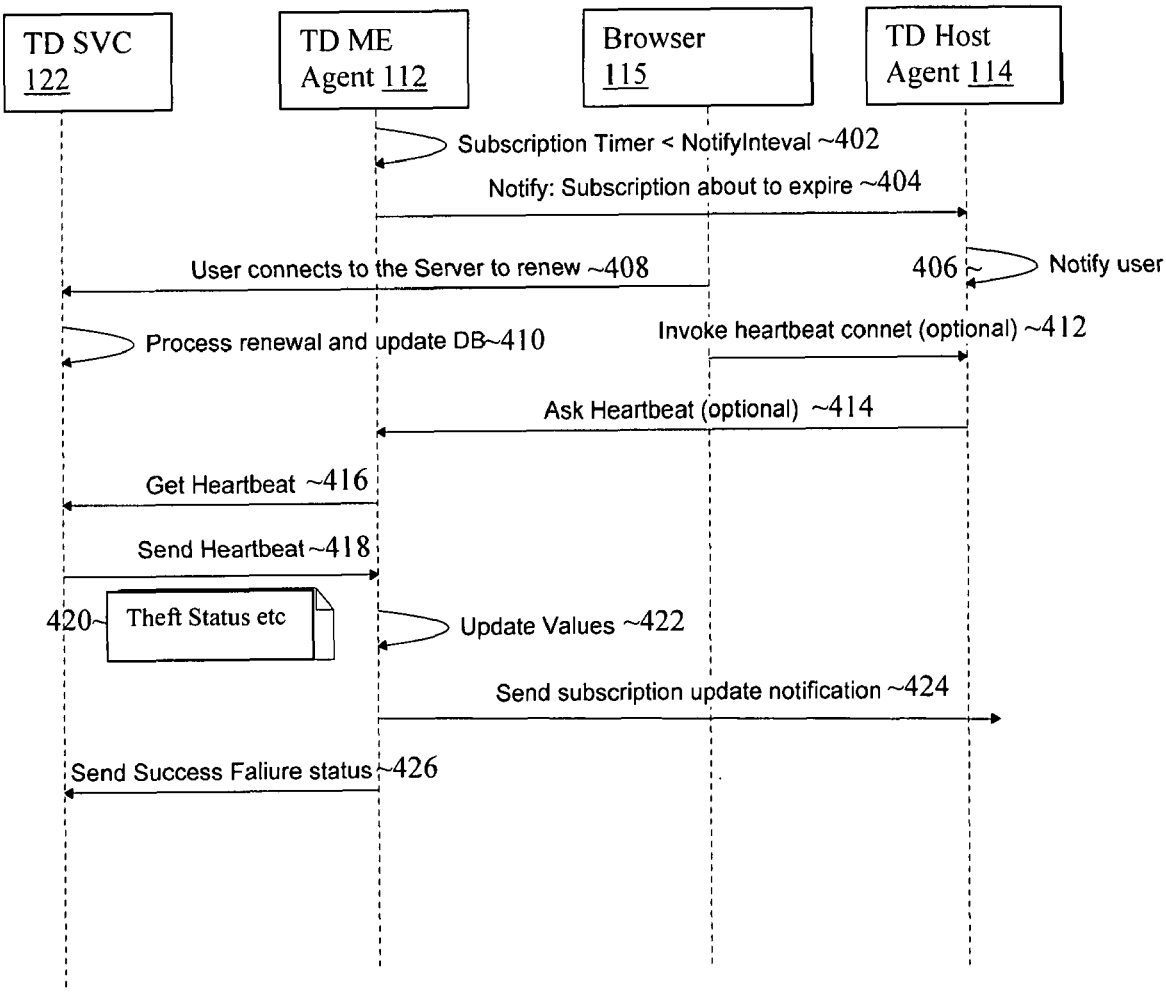
FIG. 4 illustrates selected operations of selected components for a processor based device to subscribe for the theft-deterrence service, in accordance with various embodiments of the present invention.

As described earlier, in various embodiments, the theft-deterrence service may be a paid service, and in others, a free service. Regardless, in various embodiments, manageability engine 112 may register with theft-deterrence service 122 to subscribe to the service. FIG. 4 illustrates selected operations of selected components for renewing subscription of the theft-deterrence service. As illustrated, for the embodiments, on expiration of a subscription timer, 402, manageability engine 112 notifies host theft-deterrence agent 114, 404.

On receipt of the notification, host theft-deterrence agent 114 notifies the user, 406. For the embodiments, client device 102 includes browser 115. For these embodiments, user may use browser 115 to connect to theft-deterrence service 122. In various embodiments, theft-deterrence service 122 may be implemented to require or not require browser 115 to have a special plug-in to be able to connect to theft-deterrence service 122 to renew a user's theft-deterrence service subscription. Regardless, once connected, theft-deterrence service 122 may facilitate user in renewing the subscription. The renewal process may be implemented in any one of a number of manners, requiring or not requiring authentication of the user, and/or payment for the subscriptions.

Upon renewal, the plug-in of browser 115 may notify manageability engine 112 via the host theft-deterrence agent, 412 and 414, to immediately resume the request for heartbeat messages, 416 and 418. Alternatively, the request for heartbeat messages, 416 and 418 may simply resume in due course.

As described earlier, on receipt of a new heartbeat message 420, manageability engine 112 applies the data contained in the heartbeat message 420, 422, and reports the success or failure of the application to theft-deterrence service 122, 426. If the obtaining and application is immediately performed as part of the subscription renewal process, manageability engine 112 may also notify the user of successful renewal, 424, via the host theft-deterrence agent.

Figure 5:
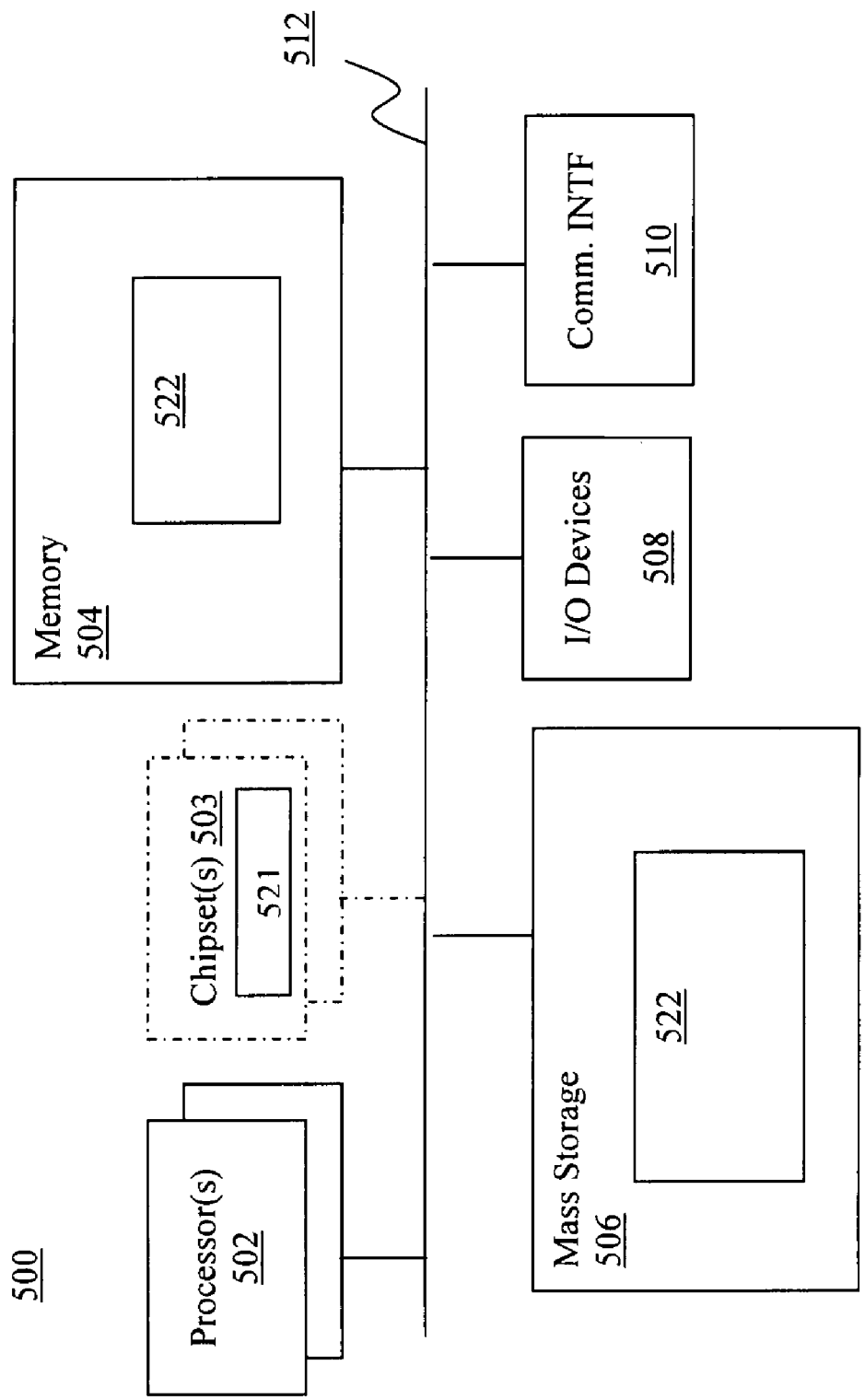
FIG. 5 illustrates an example computer system suitable for use to practice various embodiments of the present invention.

FIG. 5 illustrates an example computer system suitable for use as a client device or a server to practice various embodiments of the present invention. As shown, computing system 500 includes a number of processors or processor cores 502, and system memory 504. For the purpose of this application, including the claims, the terms "processor" and "processor cores" may be considered synonymous, unless the context clearly requires otherwise. When use as a client device 102, computer system 500 may further include chipset 503. Additionally, computing system 500 includes mass storage devices 506 (such as diskette, hard drive, compact disc read only memory (CDROM) and so forth), input/output devices 508 (such as display, keyboard, cursor control and so forth) and communication interfaces 510 (such as network interface cards, modems and so forth). The elements are coupled to each other via system bus 512, which represents one or more buses. In the case of multiple buses, they are bridged by one or more bus bridges (not shown).

Each of these elements performs its conventional functions known in the art. In particular, chipset 503 may be employed to practice all or some of the described aspects of manageability engine 112 (shown as 521). System memory 504 and mass storage 506 may be employed to store a working copy and a permanent copy of the programming instructions implementing, in whole or in part, the various other components, such as host theft-deterrence agent 114 or theft-deterrence service 122 (herein commonly denoted as 522), depending on whether computer system 500 is used as a client device 102 or as server 106. The various components may be implemented by assembler instructions supported by processor(s) 502 or high-level languages, such as C, that can be compiled into such instructions.

The permanent copy of the programming instructions may be placed into permanent storage 506 in the factory, or in the field, through, for example, a distribution medium (not shown), such as a compact disc (CD), or through communication interface 510 (from a distribution server (not shown)). That is, one or more distribution media having an implementation of the agent program may be employed to distribute the agent and program various computing devices.

The constitution of these elements 502-512 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein.

Therefore, it is manifestly intended that the embodiments of the present invention be limited only by the claims and the equivalents thereof.

What is claimed is:

1. An article of manufacture, comprising:
   a tangible non-transitory computer-readable storage medium;
   a plurality of programming instructions stored in the storage medium, wherein, in response to execution of the instructions by a device, the programming instructions are configured to cause the device to perform operations including:
   receiving, by a manageability engine of the device, a notification indicative of an availability of a network connection from a theft-deterrence agent operated by a processor of the device in an application execution environment operated by the processor, wherein the manageability engine resides on a chipset of the device and is configured to operate concurrently with the theft-deterrence agent, outside the application execution environment, and independently from the processor;
   periodically obtaining, by the manageability engine, via the network connection, a theft status of the device from a theft-deterrence server remotely disposed from the device in response to said receiving of the notification, wherein periodically obtaining includes transmitting a request message, wherein the request message includes:
   the theft status currently held by the manageability engine;
   a current timer value, at expiration of which, the manageability engine is configured to enforce the theft-deterrence policy on the device; and
   at least one of a current platform disable priority value, a current encrypted data disable priority value, and a current theft-deterrence server rendezvous priority value; and
   enforcing, by the manageability engine, a theft-deterrence policy on the device based on the theft status of the device.

2. The article of claim 1, wherein the operations further comprise:
   sending, by the manageability engine, an alert to the host theft-deterrence agent if the theft status denotes stolen status;
   providing, by the manageability engine, to the host theft-deterrence agent, a notification of expiration of a theft-deterrence service subscription; and
   receiving notification by the manageability engine, from the host theft-deterrence agent, a renewal of the theft-deterrence service subscription.

3. The article of claim 1, wherein the operations further comprise invoking, by the manageability engine, a boot process to reboot the device, and to provide a basic input/output system (BIOS) of the device with a lock down instruction to abort boot up of the device to lock down the device.

4. The article of claim 3, wherein the operations further comprise allowing, by the manageability engine, the BIOS to unlock the device upon reception of appropriate unlocking key.

5. The article of claim 1, wherein said periodically obtaining comprises:
   waiting, by the manageability engine, expiration of a predefined request timer,
   transmitting, via the network connection, by the manageability engine, on expiration of the request timer, the request message to the theft-deterrence server for the theft status of the device, and
   receiving, via the network connection, by the manageability engine, the requested theft status from the theft-deterrence server.

6. A method, comprising:
   determining, by a manageability engine of a device, whether a theft status of the device is stolen, on expiration of a timer, wherein determining includes transmitting a request message, wherein the request message includes:
   the theft status currently held by the manageability engine;
   a value of the timer, at expiration of which, the manageability engine is configured to enforce the theft-deterrence policy on the device; and
   at least one of a current platform disable priority value, a current encrypted data disable priority value, and a current theft-deterrence server rendezvous priority value;
   on determining that the theft status of the processor based device is stolen, alerting, by the manageability engine, a host theft-deterrence agent of the device, the host theft-deterrence agent being operated by a processor of the device in an application execution environment operated by the processor, and the manageability engine residing on a chipset of the device and being operated outside the application execution environment, concurrently with the host theft-deterrence agent and independently from the processor;
   causing, by the host theft-deterrence agent, on receipt of the alert, the device to reboot; and enforcing, by the manageability engine, a theft-deterrence policy on the device.

7. The method of claim 6, further comprising causing the device to lock down if a user of the device is unable to provide an unlock secret acceptable to the manageability engine during said reboot.

8. The method of claim 7, further comprising soliciting, by a basic input/output system (BIOS), the unlock secret from the user, providing an inputted unlock secret to the manageability engine, and receiving an indication from the manageability engine indicating whether the provided unlock secret is acceptable to the manageability or not.

9. The method of claim 6, wherein said determining comprises:
receiving, by the manageability engine of the device, a notification indicative of an availability of a network connection from the host theft-deterrence agent;
waiting, by the manageability engine, expiration of the timer;
transmitting, via the network connection, by the manageability engine, on expiration of the timer, the request message to a theft-deterrence server for the theft status of the device; and
receiving, via the network connection, by the manageability engine, the requested theft status from the theft-deterrence server.

10. The method of claim 6, further comprises:
applying, by the manageability engine, the received theft status;
transmitting, by the manageability engine, a status indicative of a result of said applying to the theft-deterrence server.

11. The method of claim 6, further comprising registering, by the manageability engine, with the theft-deterrence server to subscribe to a theft-deterrence service.

12. The method of claim 6, further comprising:
providing, by the manageability engine, a notification of expiration of a theft-deterrence service subscription to the host theft-deterrence agent; and
notifying the manageability engine, by the host theft-deterrence agent, a renewal of the theft-deterrence service subscription.

13. An apparatus, comprising:
a processor configured to operate a theft-deterrence agent in an application execution environment, wherein the theft-deterrence agent is configured to check availability of a network connection; and
a manageability engine residing on a chipset coupled to the processor and configured to operate outside the application execution environment, concurrently with the theft-deterrence agent, and independently from the processor, wherein the manageability engine is further configured to:
receive a notification indicative of the availability of a network connection from the theft-deterrence agent;
periodically obtain, via the network connection, a theft status of the apparatus from a theft-deterrence server remotely disposed from the apparatus, wherein to periodically obtain the theft status, the manageability engine is configured to transmit a request message, wherein the request message includes:
the theft status currently held by the manageability engine;
a current value of a timer, at expiration of which, the manageability engine is configured to enforce the theft-deterrence policy on the device; and
at least one of a current platform disable priority value, a current encrypted data disable priority value, and a current theft-deterrence server rendezvous priority value; and
enforce a theft-deterrence policy on the apparatus based on the theft status of the apparatus.

14. The apparatus of claim 13, wherein the periodically obtain includes:
wait for expiration of the timer;
transmit, via the network connection, on expiration of the timer, the request message to the theft-deterrence server for the theft status of the device; and
receive, via the network connection, the requested theft status from the theft-deterrence server.

15. A system, comprising:
a processor configured to operate a theft-deterrence agent in an application execution environment, wherein the theft-deterrence agent is configured to check availability of a network connection;
a manageability engine residing on a chipset coupled to the processor and configured to operate outside the application execution environment, concurrently with the theft-deterrence agent, and independently from the processor, wherein the manageability engine is further configured to:
receive a notification indicative of the availability of a network connection from the theft-deterrence agent;
periodically obtain, via the network connection, a theft status of the apparatus from a theft-deterrence server remotely disposed from the apparatus, wherein to periodically obtain the theft status, the manageability engine is configured to transmit a request message, wherein the request message includes:
the theft status currently held by the manageability engine;
a current value of a timer, at expiration of which, the manageability engine is configured to enforce the theft-deterrence policy on the device; and
at least one of a current platform disable priority value, a current encrypted data disable priority value, and a current theft-deterrence server rendezvous priority value; and
enforce a theft-deterrence policy on the apparatus based on the theft status of the apparatus; and
a BIOS coupled to the manageability engine and configured to obtain a system lock down status from the manageability engine.

* * * * *